(12) United States Patent
Pan et al.

(10) Patent No.: US 12,552,684 B2
(45) Date of Patent: Feb. 17, 2026

(54) SEWAGE PURIFICATION TREATMENT APPARATUS CAPABLE OF BEING ASSEMBLED IN PREFABRICATED WAY

(71) Applicant: JIANGSU TAIYUAN ENVIRONMENTAL SCIENCE AND TECHNOLOGY CO., LTD., Wuxi (CN)

(72) Inventors: Hailong Pan, Wuxi (CN); Jingyu Pan, Wuxi (CN); Chun Lu, Wuxi (CN); Ke Lu, Wuxi (CN); Xiangming Bao, Wuxi (CN); Meijuan Pan, Wuxi (CN); Hui Cao, Wuxi (CN); Yunfei Qian, Wuxi (CN); Liang Zhu, Wuxi (CN)

(73) Assignee: JIANGSU TAIYUAN ENVIRONMENTAL SCIENCE AND TECHNOLOGY CO., LTD., Wuxi (CN)

( * ) Notice: Subject to any disclaimer, the term of this patent is extended or adjusted under 35 U.S.C. 154(b) by 404 days.

(21) Appl. No.: 18/365,769

(22) Filed: Aug. 4, 2023

(65) Prior Publication Data

US 2024/0294397 A1    Sep. 5, 2024

Related U.S. Application Data

(63) Continuation of application No. PCT/CN2023/098542, filed on Jun. 6, 2023.

(30) Foreign Application Priority Data

Mar. 2, 2023  (CN) .......................... 202310209952.3

(51) Int. Cl.
*C02F 1/00* (2023.01)
*B01D 29/64* (2006.01)
(Continued)

(52) U.S. Cl.
CPC .......... *C02F 1/001* (2013.01); *B01D 29/6415* (2013.01); *C02F 9/00* (2013.01);
(Continued)

(58) Field of Classification Search
CPC .... C02F 1/68; C02F 9/00; C02F 1/001; C02F 2103/005; C02F 2201/002; C02F 2303/22; B01D 29/6415
See application file for complete search history.

(56) References Cited

FOREIGN PATENT DOCUMENTS

| CN | 108558076 A | 9/2018 |
|---|---|---|
| CN | 211636040 U | 10/2020 |

(Continued)

OTHER PUBLICATIONS

First Office Action issued in counterpart Chinese Patent Application No. 202310209952.3, dated Aug. 19, 2023.
(Continued)

*Primary Examiner* — Terry K Cecil
(74) *Attorney, Agent, or Firm* — Westbridge IP LLC

(57) ABSTRACT

A sewage purification treatment apparatus capable of being assembled in a prefabricated way includes a treatment table, an aeration tank, a filter tank, a water pump, a dosing assembly, a filtering assembly, a cleaning assembly and a washing assembly, the aeration tank and the filter tank are disposed at the top of the treatment table at an interval, an aeration plate is disposed at the bottom end of the inside of the aeration tank. The cleaning assembly works with the filtering assembly to automatically clean the screen in the filtering assembly to prevent impurities from blocking the screen, meanwhile, the screen can be automatically moved out of the filter tank for easy replacement, which is very convenient.

6 Claims, 14 Drawing Sheets

(51) Int. Cl.
*C02F 1/68* (2023.01)
*C02F 9/00* (2023.01)
*C02F 103/00* (2006.01)

(52) U.S. Cl.
CPC .......... *C02F 1/68* (2013.01); *C02F 2103/005* (2013.01); *C02F 2201/002* (2013.01); *C02F 2303/22* (2013.01)

(56) References Cited

FOREIGN PATENT DOCUMENTS

| CN | 212417142 U | 1/2021 |
| CN | 214052685 U | 8/2021 |
| CN | 114262113 A | 4/2022 |
| CN | 114523763 A | 5/2022 |
| CN | 115340227 A | 11/2022 |
| CN | 116062946 A | 5/2023 |
| GB | 1207009 A | 9/1970 |
| WO | 2019218734 A1 | 11/2019 |

OTHER PUBLICATIONS

International Search Report and Written Opinion issued in corresponding PCT Application No. PCT/CN2023/098542, dated Nov. 11, 2023.

SEWAGE PURIFICATION TREATMENT APPARATUS CAPABLE OF BEING ASSEMBLED IN PREFABRICATED WAY

CROSS-REFERENCE TO RELATED APPLICATIONS

This application is a continuation of International Application No. PCT/CN2023/098542, filed on Jun. 6, 2023, which claims priority to Chinese Patent Application No. 202310209952.3, filed on Mar. 2, 2023. All of the aforementioned applications are incorporated herein by reference in their entireties.

TECHNICAL FIELD

The application relates to the technical field of sewage treatment, in particular to a sewage purification treatment apparatus capable of being assembled in a prefabricated way.

BACKGROUND

Sewage treatment is a process of purifying sewage to meet the requirements of water quality discharged into a certain water body or reused. Sewage treatment is widely used in various fields such as building, agriculture, traffic, energy, petrochemical industry, environmental protection, urban landscape, medical treatment and catering, and it has also increasingly entered the daily life of ordinary people.

Chinese Patent Application Publication No. CN111499035A discloses a sewage purification treatment apparatus, which includes a support base, a treatment barrel is fixedly connected to the upper surface of the support base, a first connecting opening is formed in the inner wall of the upper end of the treatment barrel, a second connecting opening is formed in the inner bottom wall of the first connecting opening, a first filtering component is disposed on the inner wall of the first connecting opening, the first filtering component includes a first mounting block, the outer surface of the lower end of the first mounting block is in threaded connection with the inner wall of the first connecting opening, and a first mounting opening is formed in the upper surface of the first mounting block. For the sewage purification treatment apparatus, the effect of fully adsorbing small-particle impurities in sewage is achieved, thus solving the problem that for an existing sewage treatment apparatus, sewage is filtered by stages in the filtering process, which increases the filtering cost of sewage treatment and reduces the working efficiency of sewage treatment.

However, the above patent has the following disadvantages in practical use: first, a large amount of impurities may attach to a screen, and the impurities easily block the screen to influence the normal work of the screen; and second, in the patent, the screen is fixedly connected on the inner wall of a first connecting ring and is located inside the treatment barrel, and once the screen is damaged under long-term use, the replacement of the screen is very troublesome.

SUMMARY

An objective of the application is to provide a sewage purification treatment apparatus capable of being assembled in a prefabricated way, to solve the problems proposed in the background that the impurities easily block the screen to influence the normal work of the screen and the screen is located inside the treatment barrel, and once the screen is damaged under long-term use, the replacement of the screen is very troublesome.

The sewage purification treatment apparatus capable of being assembled in a prefabricated way provided by the application includes a treatment table, an aeration tank, a filter tank, a water pump, a dosing assembly, a filtering assembly, a cleaning assembly and a washing assembly, the aeration tank and the filter tank are disposed at the top of the treatment table at an interval, an aeration plate is disposed at the bottom end of the inside of the aeration tank, the aeration plate is provided with a plurality of aeration heads, the aeration plate is provided with an air transmission pipe connected with an external air source, the outer wall of the bottom end of the filter tank is provided with a drain pipe communicated with its inside, the water pump is disposed horizontally between the aeration tank and the filter tank, a first water pipe is disposed between the input end of the water pump and the aeration tank, a second water pipe is disposed between the output end of the water pump and the filter tank, the dosing assembly is mounted at the top end of the aeration tank, the filtering assembly is mounted inside the filter tank, the top end of the filtering assembly extends above the filter tank, the cleaning assembly is mounted on the top of the treatment table, one end of the cleaning assembly extends above the filter tank, and the washing assembly is mounted on the top of the treatment table.

Furthermore, the dosing assembly includes a dosing rack, a first lead screw slide table, a moving plate, an agent tank, a collection box, an agent control component, a scraping component, two supports and two moving rails, the two supports are symmetrically disposed on the outer wall of the top end of the aeration tank, the two moving rails are respectively disposed on the tops of the two supports, the dosing rack is mounted on two moving rails in a sliding manner, the first lead screw slide table is disposed horizontally on the top of one of the supports, the moving plate is mounted on the moving end of the first lead screw slide table, the moving plate is connected with the dosing rack, the agent tank is vertically disposed on the top of the dosing rack, the top and the bottom of the agent tank are respectively provided with an agent feeding tube and an agent discharge tube, the collection box is mounted on the outer wall of the top end of the aeration tank, the agent control component is mounted at the top end of the dosing rack, and the scraping component is mounted on the outer wall of the top end of the dosing rack.

Furthermore, the agent control component includes an agent control shaft, an agent control disk, an agent control motor, a driving wheel, a driven wheel and a belt, the agent control shaft is rotatably mounted at the top end of the dosing rack, the agent control disk is mounted at the bottom of the agent control shaft, the top of the agent control disk attaches to the bottom of the agent discharge tube, the agent control disk is provided with an agent control hole corresponding to the agent discharge tube, the agent control motor is vertically disposed at the top end of the dosing rack, the driving wheel is mounted on an output shaft of the agent control motor, the driven wheel is mounted on the agent control shaft, and the belt sleeves the outside of the driving wheel and the driven wheel.

Furthermore, the scraping component includes a mounting plate, a scraper, two mounting racks and two electric push rods, the two mounting racks are symmetrically disposed at the top end of the dosing rack, the two electric push rods are respectively disposed on the two mounting racks, the mounting plate is mounted on the output ends of the two electric push rods, and the scraper is mounted on the bottom of the mounting plate.

Furthermore, the filtering assembly includes a containing frame, a screen, two sliding grooves, two limiting rails and two lifting components, the two sliding grooves are symmetrically disposed on the inner wall of the filter tank, the two limiting rails are symmetrically disposed at the top of the filter tank, the inside of the two limiting rails is matched with the two sliding grooves, the containing frame is disposed on the filter tank, two sides of the containing frame are in sliding fit with the two sliding grooves, the screen is detachably mounted in the containing frame, the two lifting components are symmetrically disposed at the top of the treatment table, and the bottom ends of the two lifting components are connected with the top of the containing frame.

Furthermore, each lifting component includes a lifting rack, a winch, a pulley and a steel rope, the lifting rack is erected at the top of the treatment table, the winch is mounted at the top of the lifting rack, the pulley is rotatably mounted at the top of the lifting rack, the top end of the steel rope is connected with the winch, and the bottom end of the steel rope penetrates through the pulley and then is connected with the top of the containing frame.

Furthermore, the cleaning assembly includes a cleaning rack, a second lead screw slide table, a hydraulic push rod, a U-shaped rack, a regulating rail, two regulating racks, two regulating push rods and two cleaning components, the cleaning rack is erected at the top of the treatment table, the second lead screw slide table is horizontally disposed at the top end of the cleaning rack, the hydraulic push rod is vertically disposed at a moving end of the second lead screw slide table, the U-shaped rack is mounted at the output end of the hydraulic push rod, the regulating rail is horizontally disposed at the top end of the U-shaped rack, the two regulating racks are slidably mounted on the regulating rail, the two regulating push rods are symmetrically disposed in the U-shaped rack, the output ends of the two regulating push rods are respectively connected with the two regulating racks, the two cleaning components are symmetrically disposed on the two regulating racks, each cleaning component includes a rotating rack, a cleaning roll and a cleaning motor, the rotating racks are mounted on the regulating racks, the cleaning roll is rotatably mounted in the rotating rack, a plurality of bristles are disposed on the cleaning roll, the cleaning motor is vertically disposed at the top of the rotating rack, and an output shaft of the cleaning motor is connected with the cleaning roll.

Furthermore, the washing assembly includes a washing table, a washing barrel, a support plate, a driving motor, a rotating gear, a cross frame, a moving rack and two guide rails, the two guide rails are symmetrically disposed at the top of the treatment table, the washing table is mounted on the two guide rails in a sliding manner, the washing barrel is vertically disposed on the top of the washing table, the outer wall of the bottom end of the washing barrel is provided with a blowdown pipe communicated with its inside, the blowdown pipe is provided with a valve, the support plate is mounted on the outer wall of the washing table, the driving motor is horizontally disposed on the top of the support plate, the rotating gear is mounted on an output shaft of the driving motor, the cross frame is mounted on the top of the treatment table, the moving rack is disposed horizontally on the top of the cross frame, and the moving rack is meshed with the rotating gear.

Furthermore, the top of the treatment table is further provided with a pollutant passing assembly, the pollutant passing assembly is located below the end, away from the washing barrel, of the blowdown pipe, the pollutant passing assembly includes a slide plate, a rotating seat, a pollutant passing barrel, a filter screen, a discharge pipe, a rotating motor, a swinging component, two sliding rails and two rotating shafts, the two sliding rails are symmetrically disposed on the top of the treatment table, the slide plate is mounted on the two sliding rails in a sliding manner, a rectangular groove is disposed at the position, at the slide plate, of the treatment table, the rotating seat is mounted on the top of the slide plate, the pollutant passing barrel is rotatably mounted at the top end of the rotating seat through two rotating shafts, the filter screen is disposed in the pollutant passing barrel, the discharge pipe is mounted on the outer wall of the bottom end of the pollutant passing barrel, the rotating motor is horizontally disposed on the outer wall of the rotating seat, the output shaft of the rotating motor is connected with one of the rotating shafts, the swinging component is mounted in the rectangular groove, the top end of the swinging component is connected with the bottom of the slide plate, the swinging component includes a swinging handle, an arc-shaped gear, a swinging rack, a swinging motor, a rotating table and an eccentric column, the swinging handle is rotatably mounted in the rectangular groove, the bottom end of the swinging handle is provided with a driving groove, the arc-shaped gear is mounted on the top of the swinging handle, the swinging rack is disposed horizontally at the bottom of the slide plate, the swinging rack is meshed with the arc-shaped gear, the swinging motor is disposed horizontally at the bottom of the treatment table, the rotating table is mounted on the output shaft of the swinging motor, the eccentric column is mounted at the edge of the rotating table, and the eccentric column is in sliding fit the driving groove.

The application provides a sewage purification treatment apparatus capable of being assembled in a prefabricated way by improving it, which has the following improvements and advantages compared with the relevant art.

First, an agent is put into the aeration tank through the dosing assembly, then air is conveyed into the aeration plate through the air transmission pipe, the plurality of aeration heads spray the air into sewage in the aeration tank to speed up the reaction between the sewage in the aeration tank and the agent, fine impurities in the sewage quickly float to the top end of the aeration tank, then the dosing assembly cleans the floating matter, then the water pump enables the treated sewage in the aeration tank to enter the filter tank through the first water pipe and the second water pipe, then the filtering assembly filters the sewage in the filter tank, the filtered sewage is discharged through the drain pipe, the cleaning assembly works with the filtering assembly to automatically clean the screen in the filtering assembly to prevent the impurities from blocking the screen, meanwhile, the screen can be automatically moved out of the filter tank for easy replacement, which is very convenient, and finally, the washing assembly washes the cleaning assembly, which is convenient for the next operation of the cleaning assembly.

Second, the second lead screw slide table drives the two cleaning components to move to two sides of the screen in match with the hydraulic push rod, then the two regulating push rods drive the two regulating racks to move on the regulating rail, the two regulating racks drive the two cleaning components to move to contact with the screen, then the cleaning motor drives the cleaning roll to rotate, the cleaning roll drives the plurality of bristles to rotate to clean the screen, and the second lead screw slide table drives the cleaning roll to move horizontally to clean up all parts of the screen, thus realizing the purpose of automatically cleaning the impurities on the screen to prevent the impurities from blocking the screen.

Third, the valve is opened, the washing sewage in the washing barrel enters the pollutant passing barrel through the blowdown pipe, the filter screen filters the sewage which then is drained through the discharge pipe, meanwhile, the swinging motor drives the rotating table and the eccentric column to rotate, the eccentric column drives the swinging handle to swing by a certain angle in a reciprocating manner by utilizing the driving groove, the swinging handle drives the swinging rack to horizontally move by a certain distance in a reciprocating manner by utilizing the arc-shaped gear, then the slide plate horizontally moves by a certain distance in a reciprocating manner, and the slide plate drives the sewage in the pollutant passing barrel to shake, thus improving the filtration efficiency of the filter screen.

BRIEF DESCRIPTION OF THE DRAWINGS

The application will be further described with reference to drawings and embodiments.

DETAILED DESCRIPTION OF THE EMBODIMENTS

Figure 1:
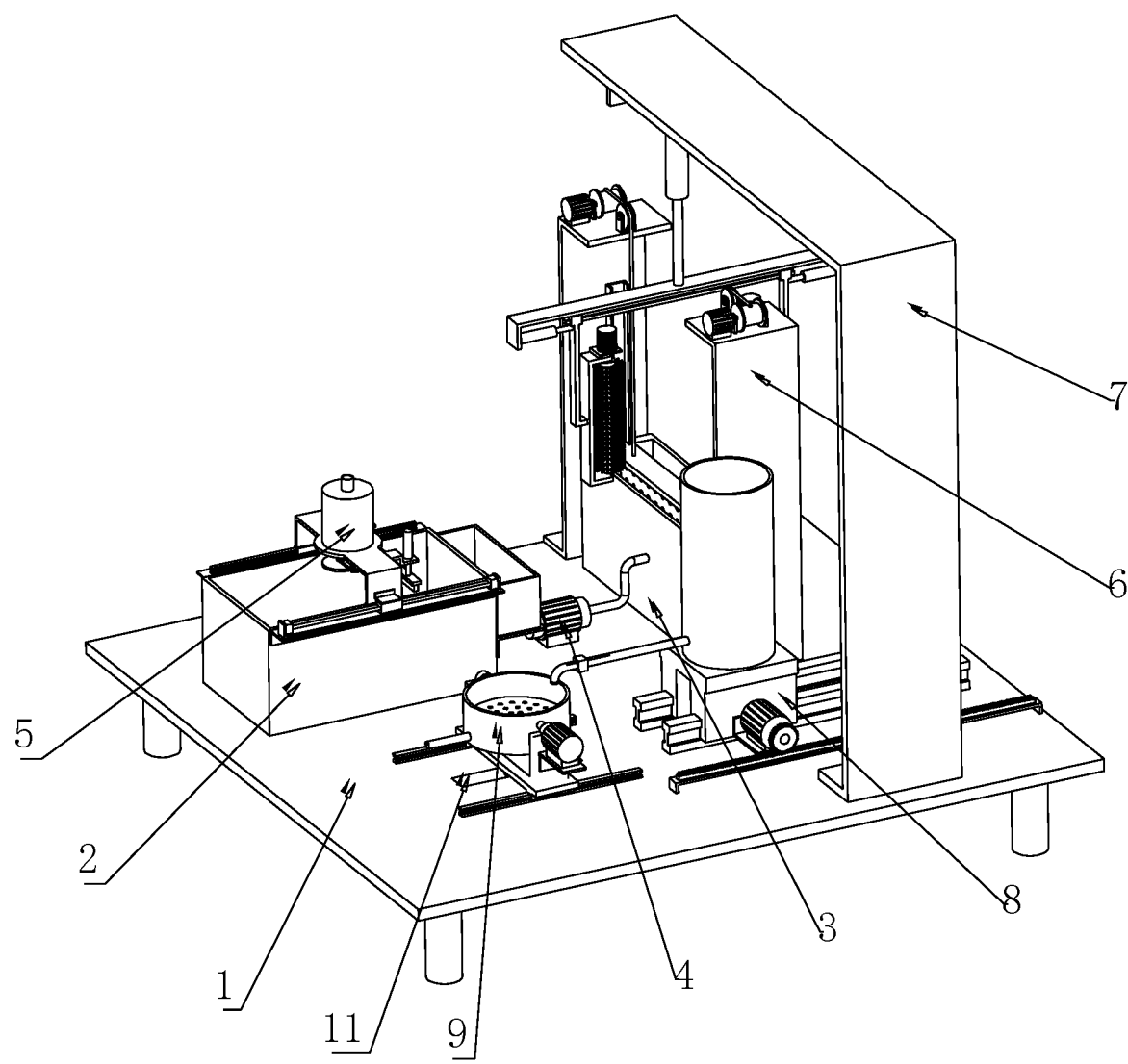
FIG. 1 is a schematic structure diagram I of a three-dimensional view of the application.
Figure 2:
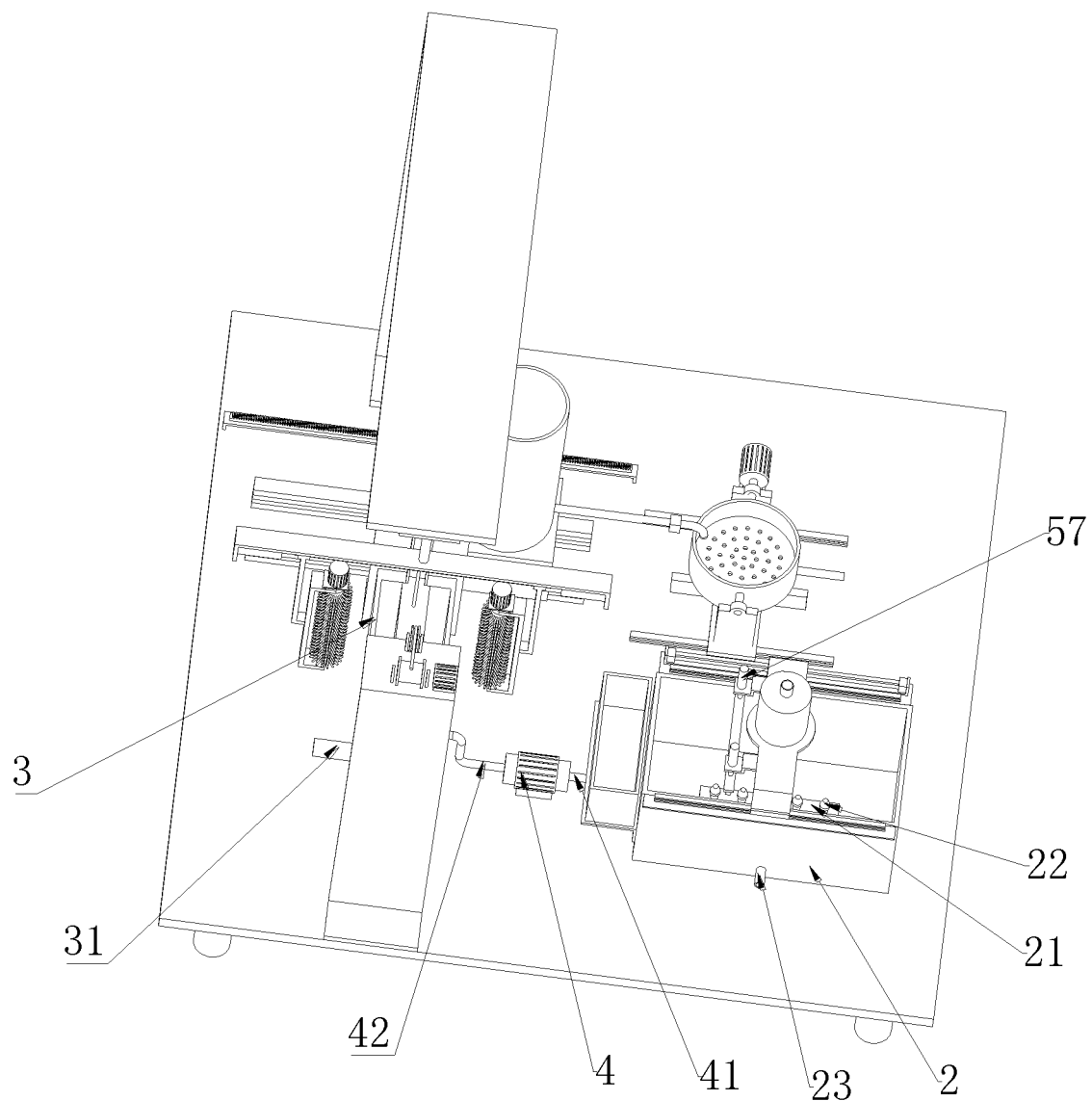
FIG. 2 is a schematic structure diagram II of a three-dimensional view of the application.
Figure 3:
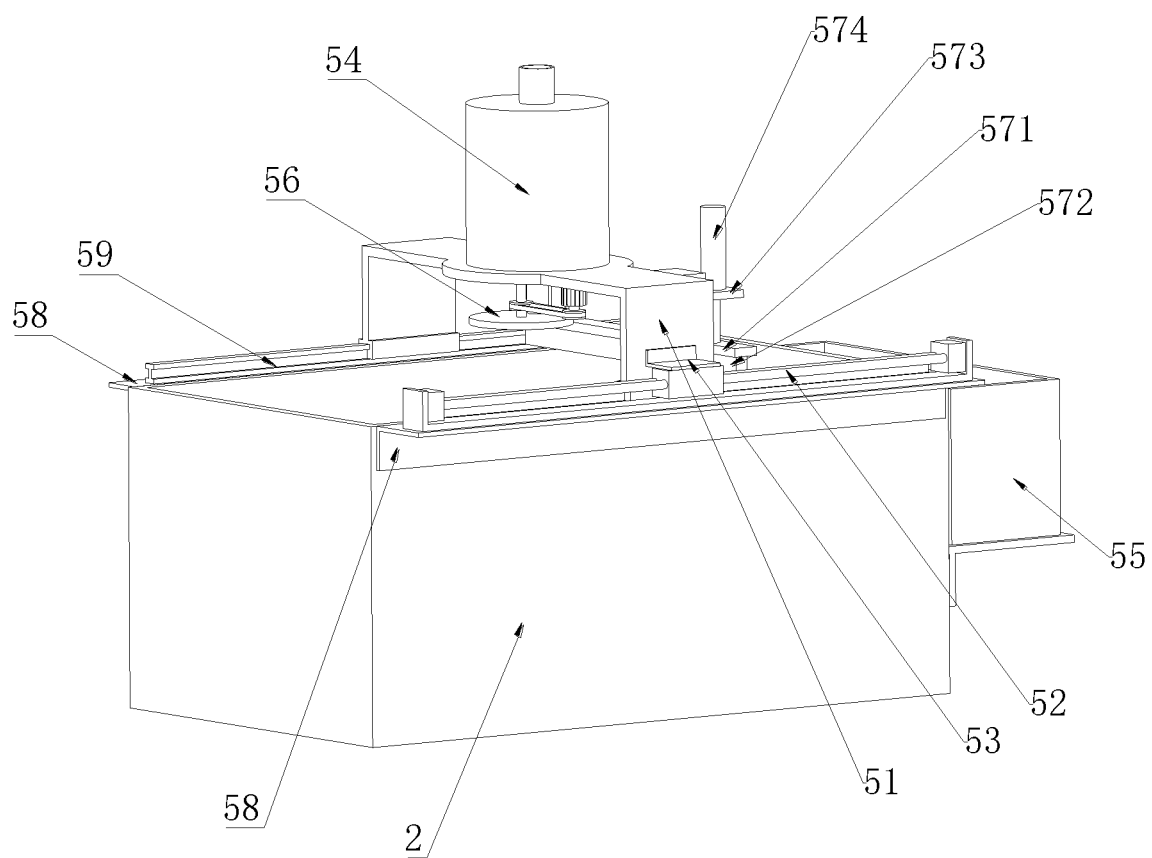
FIG. 3 is a partial schematic structure diagram I of a three-dimensional view of the application.
Figure 4:
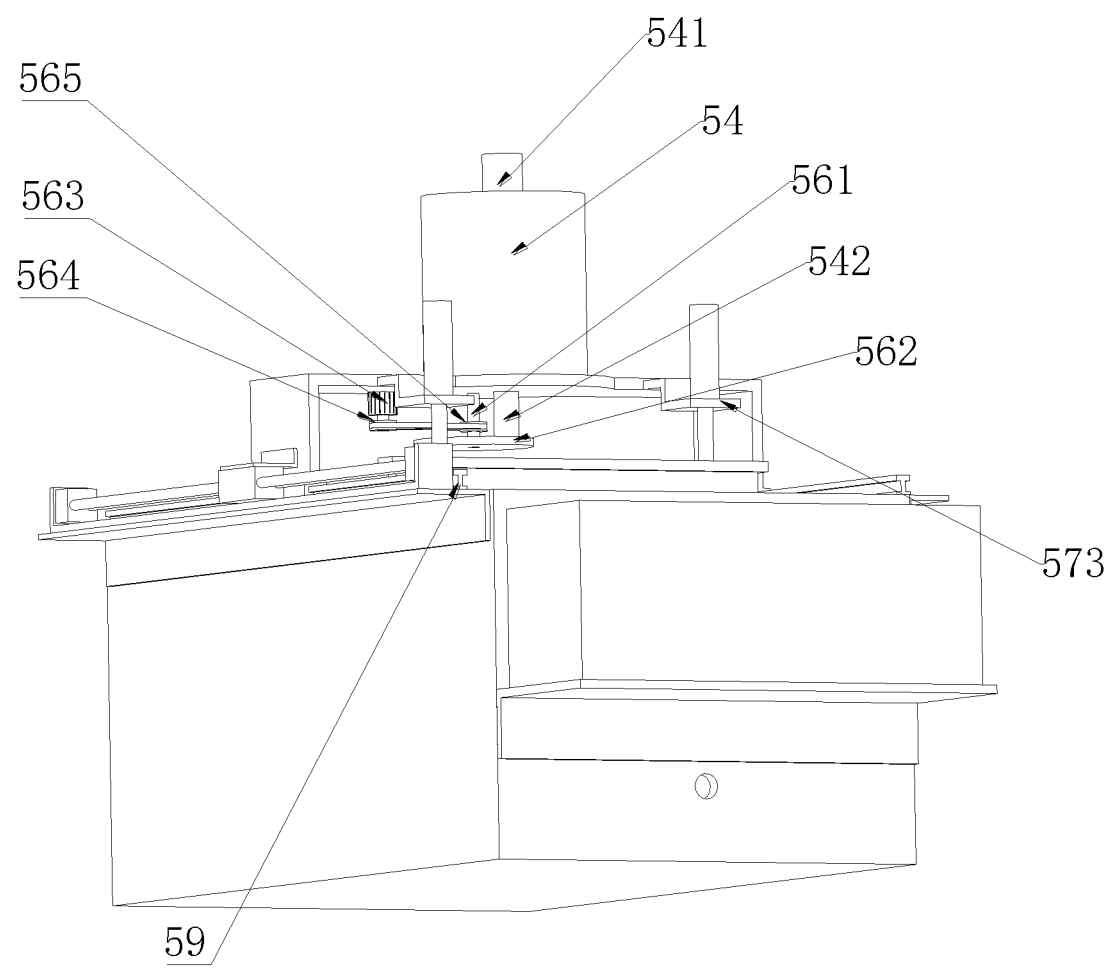
FIG. 4 is a partial schematic structure diagram II of a three-dimensional view of the application.
Figure 5:
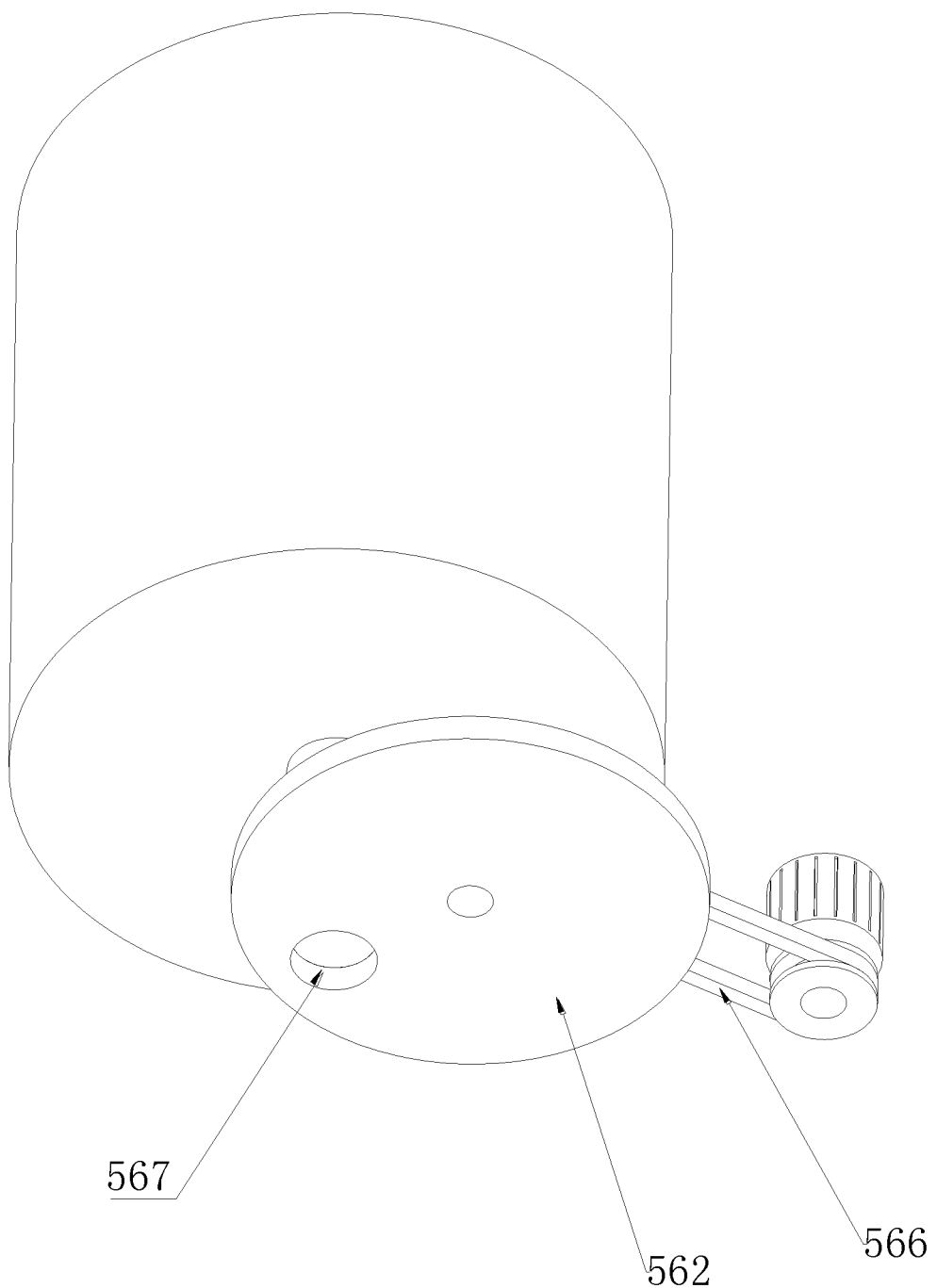
FIG. 5 is a schematic structure diagram of a three-dimensional view of a dosing component of the application.
Figure 6:
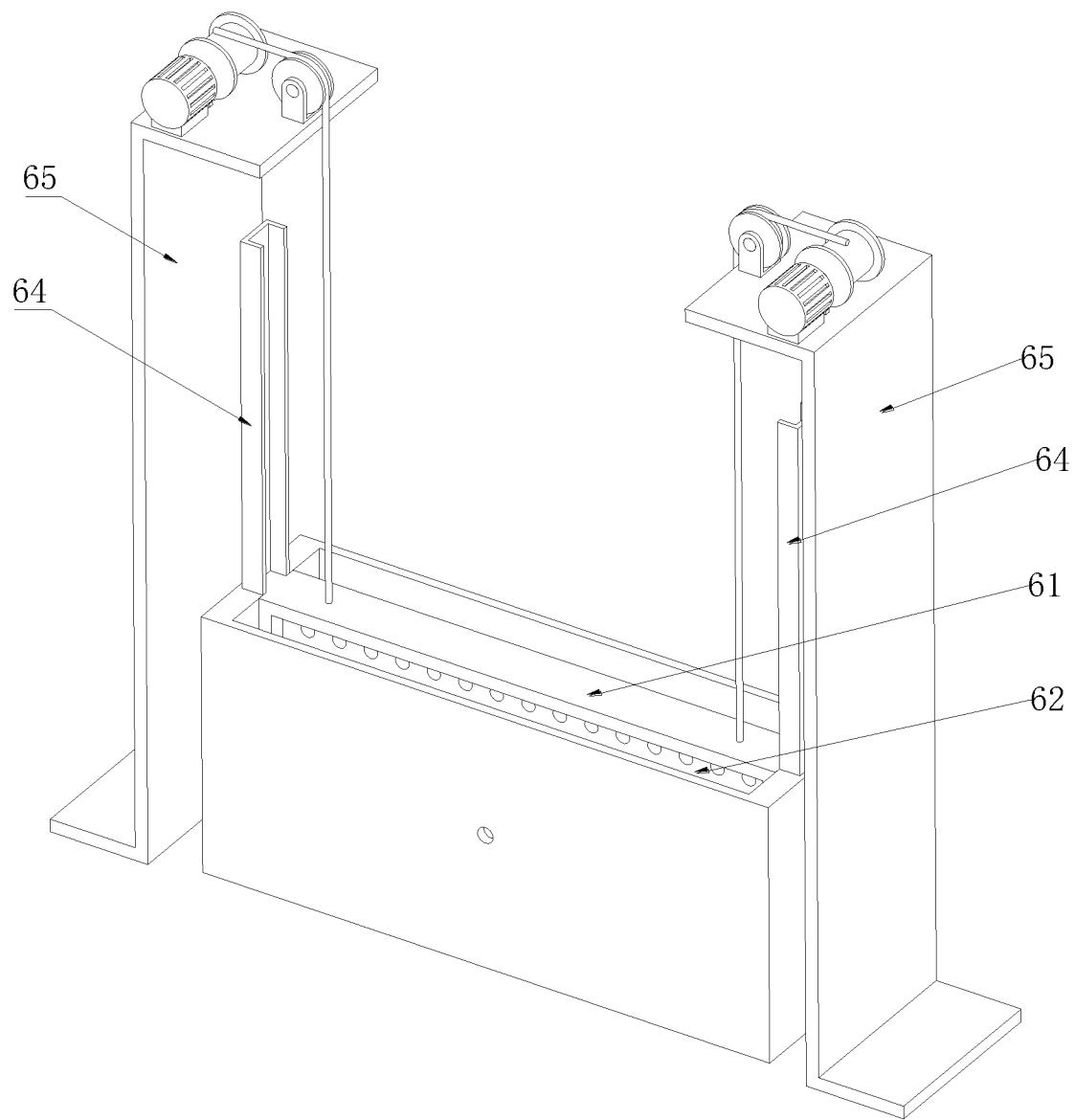
FIG. 6 is a partial schematic structure diagram III of a three-dimensional view of the application.
Figure 7:
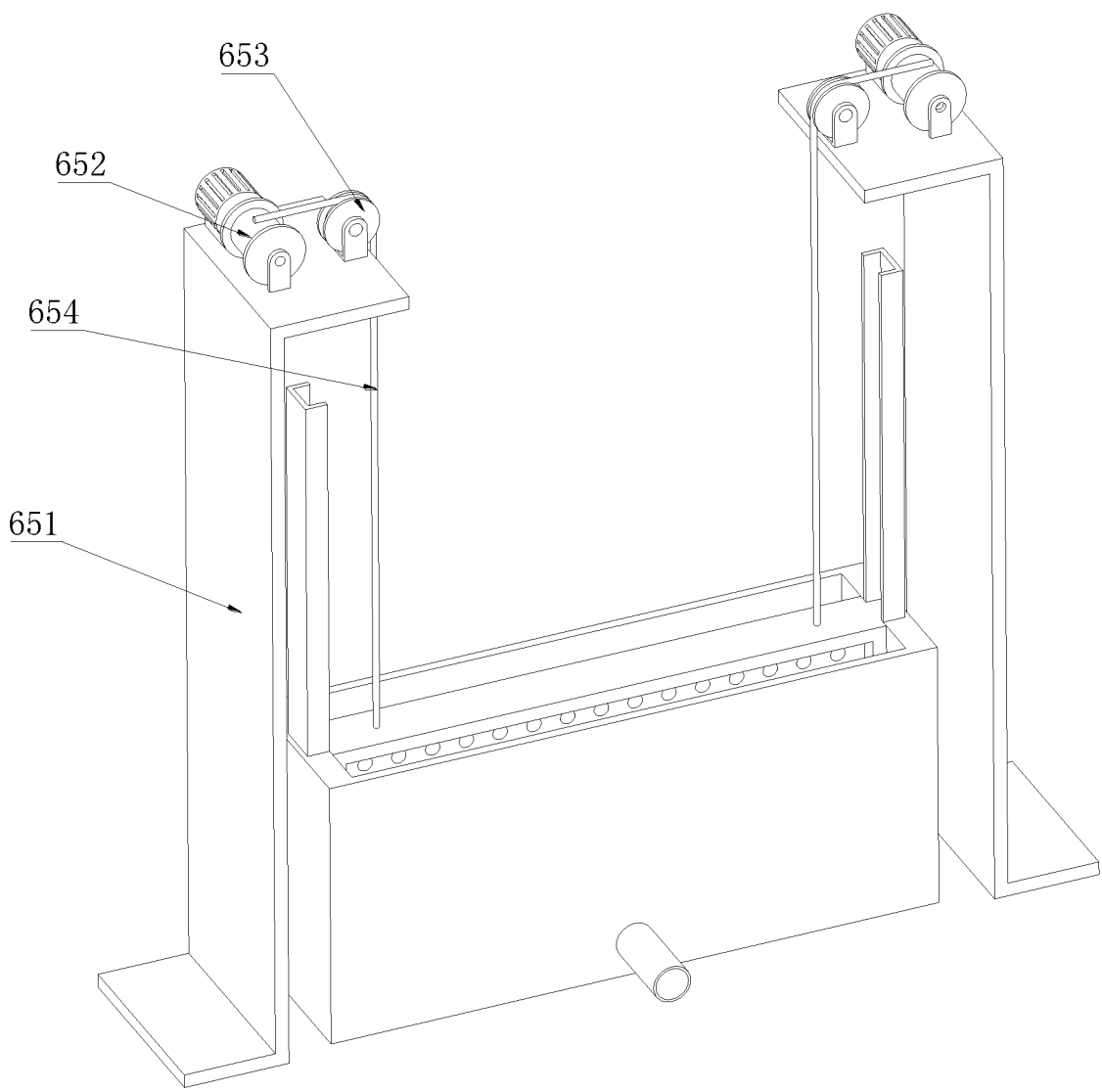
FIG. 7 is a partial schematic structure diagram IV of a three-dimensional view of the application.
Figure 8:
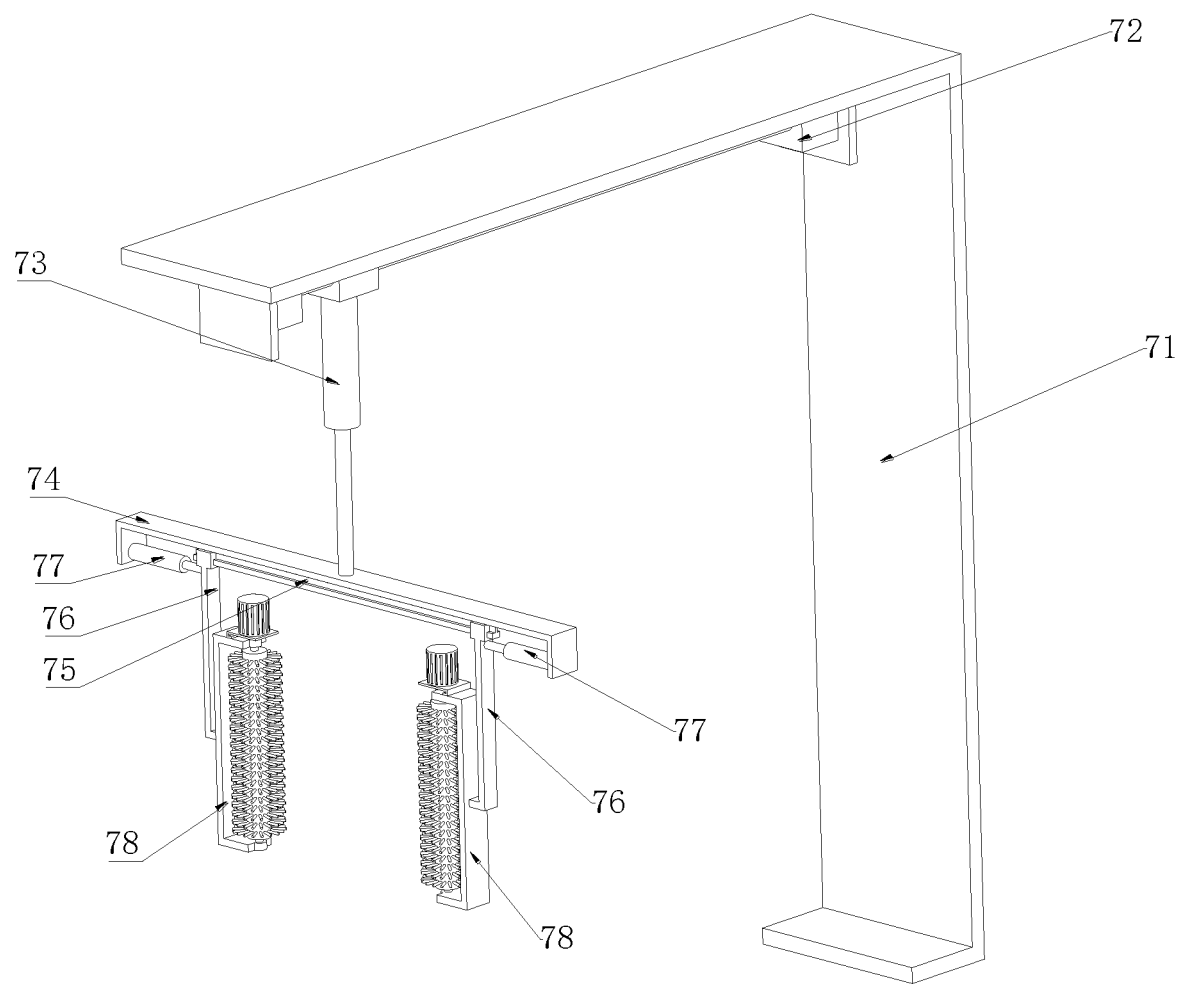
FIG. 8 is a schematic structure diagram of a three-dimensional view of a cleaning assembly of the application.
Figure 9:
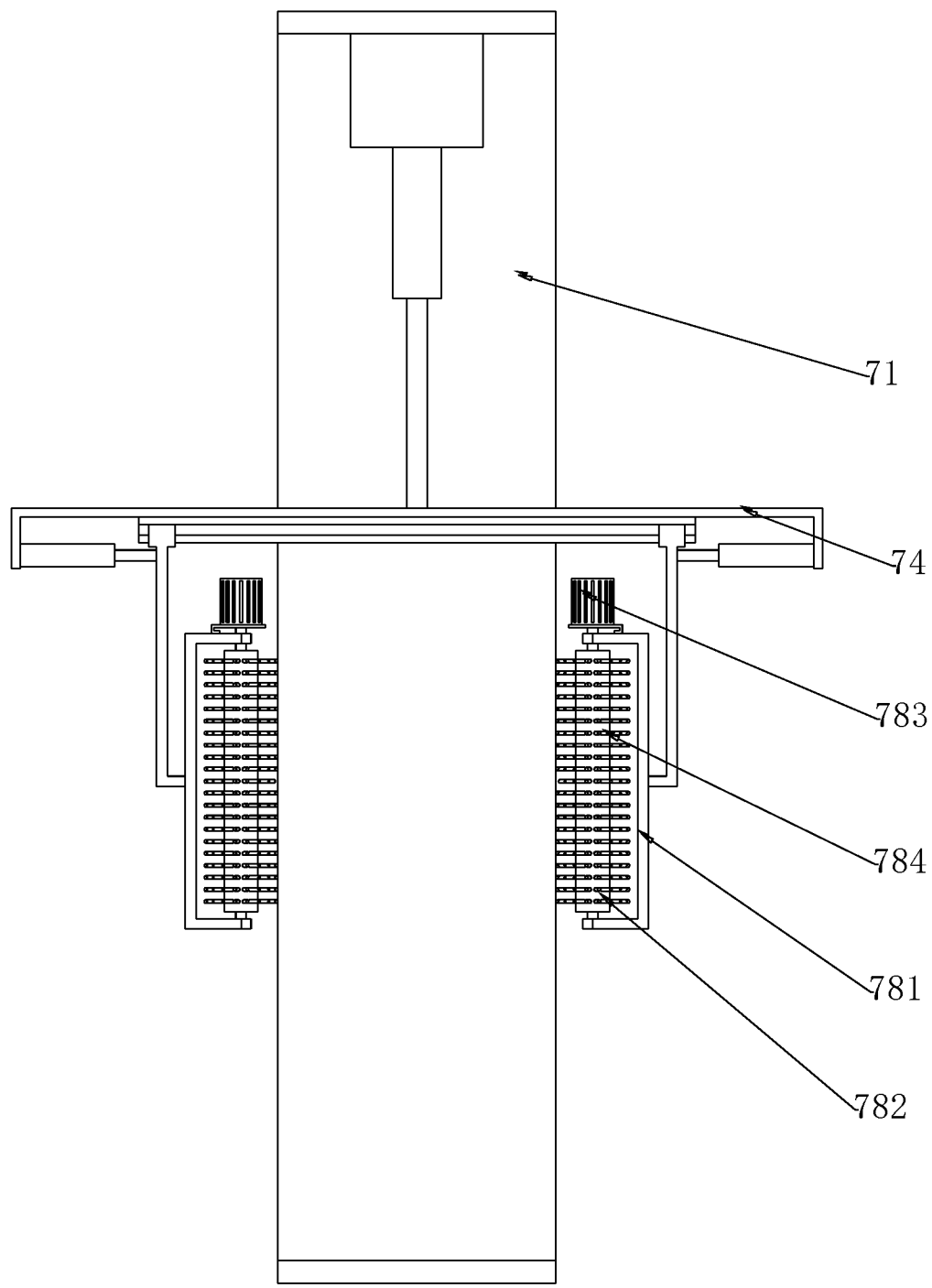
FIG. 9 is a schematic structure diagram of a side view of a cleaning assembly of the application.
Figure 10:
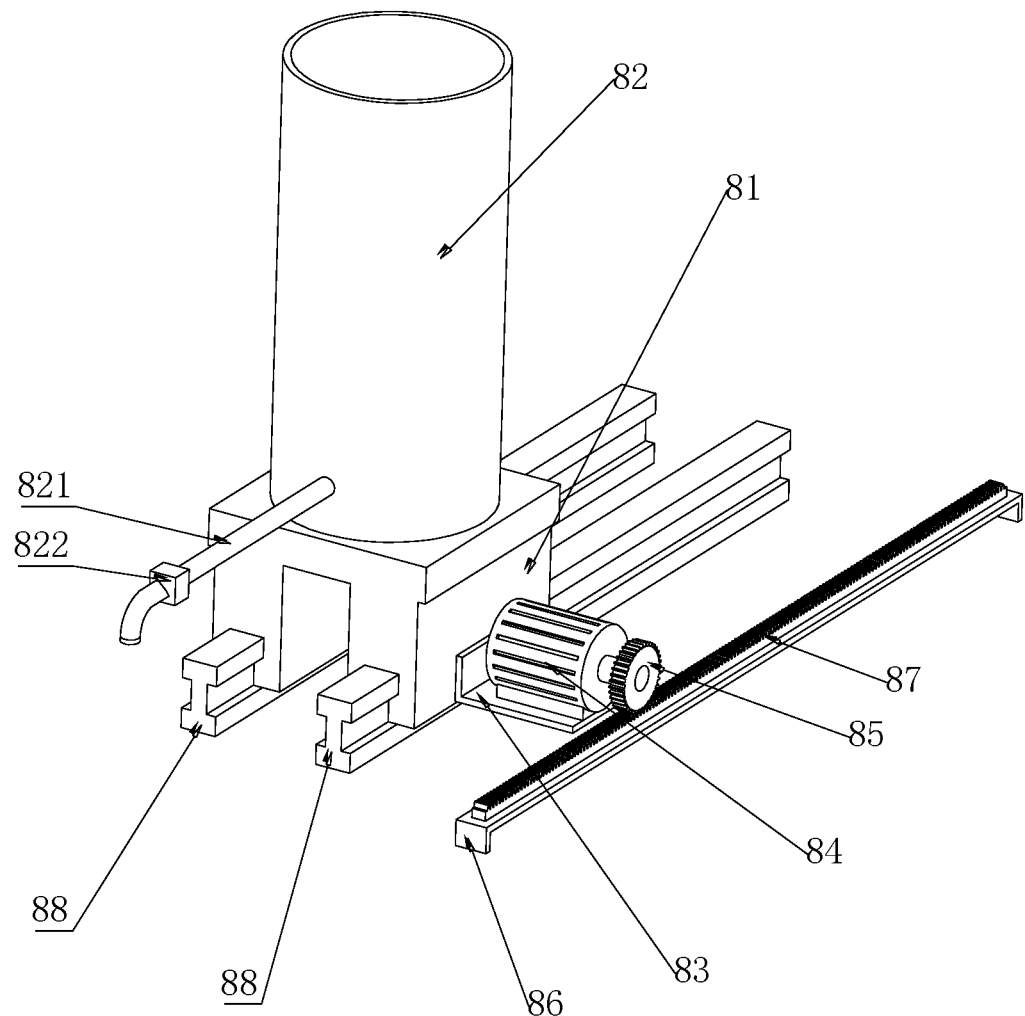
FIG. 10 is a schematic structure diagram of a three-dimensional view of a washing assembly of the application.

The following is a detailed description of the application, the technical solutions in embodiments of the application will be clearly and completely described, and obviously, the described embodiments are a part rather than all of the embodiments of the application. All other embodiments obtained by those of ordinary skill in the art based on the embodiments of the application without creative efforts shall fall within the protection scope of the application.

Embodiment 1

As shown in FIGS. 1-13, a sewage purification treatment apparatus capable of being assembled in a prefabricated way includes a treatment table 1, an aeration tank 2, a filter tank 3, a water pump 4, a dosing assembly 5, a filtering assembly 6, a cleaning assembly 7 and a washing assembly 8, the aeration tank 2 and the filter tank 3 are disposed at the top of the treatment table 1 at an interval, an aeration plate 21 is disposed at the bottom end of the inside of the aeration tank 2, the aeration plate 21 is provided with a plurality of aeration heads 22, the aeration plate 21 is provided with an air transmission pipe 23 connected with an external air source, the outer wall of the bottom end of the filter tank 3 is provided with a drain pipe 31 communicated with its inside, the water pump 4 is disposed horizontally between the aeration tank 2 and the filter tank 3, a first water pipe 41 is disposed between the input end of the water pump 4 and the aeration tank 2, a second water pipe 42 is disposed between the output end of the water pump 4 and the filter tank 3, the dosing assembly 5 is mounted at the top end of the aeration tank 2, the filtering assembly 6 is mounted inside the filter tank 3, the top end of the filtering assembly 6 extends above the filter tank 3, the cleaning assembly 7 is mounted on the top of the treatment table 1, one end of the cleaning assembly 7 extends above the filter tank 3, and the washing assembly 8 is mounted on the top of the treatment table 1; an agent is put into the aeration tank 2 through the dosing assembly 5, then air is conveyed into the aeration plate 21 through the air transmission pipe 23, the plurality of aeration heads 22 spray the air into sewage in the aeration tank 2 to speed up the reaction between the sewage in the aeration tank 2 and the agent, fine impurities in the sewage quickly float to the top end of the aeration tank 2, then the dosing assembly 5 cleans the floating matter, then the water pump 4 enables the treated sewage in the aeration tank 2 to enter the filter tank 3 through the first water pipe 41 and the second water pipe 42, then the filtering assembly 6 filters the sewage in the filter tank 3, the filtered sewage is discharged through the drain pipe 31, the cleaning assembly 7 works with the filtering assembly 6 to automatically clean the screen 62 in the filtering assembly 6 to prevent the impurities from blocking the screen 62, meanwhile, the screen 62 can be automatically moved out of the filter tank 3 for easy replacement, which is very convenient, and finally, the washing assembly 8 washes the cleaning assembly 7, which is convenient for the next operation of the cleaning assembly 7.

Specifically, the dosing assembly 5 includes a dosing rack 51, a first lead screw slide table 52, a moving plate 53, an agent tank 54, a collection box 55, an agent control component 56, a scraping component 57, two supports 58 and two moving rails 59, the two supports 58 are symmetrically disposed on the outer wall of the top end of the aeration tank 2, the two moving rails 59 are respectively disposed on the tops of the two supports 58, the dosing rack 51 is mounted on two moving rails 59 in a sliding manner, the first lead screw slide table 52 is disposed horizontally on the top of one of the supports 58, the moving plate 53 is mounted on the moving end of the first lead screw slide table 52, the moving plate 53 is connected with the dosing rack 51, the agent tank 54 is vertically disposed on the top of the dosing rack 51, the top and the bottom of the agent tank 54 are respectively provided with an agent feeding tube 541 and an agent discharge tube 542, the collection box 55 is mounted on the outer wall of the top end of the aeration tank 2, the agent control component 56 is mounted at the top end of the dosing rack 51, and the scraping component 57 is mounted on the outer wall of the top end of the dosing rack 51; the first lead screw slide table 52 drives the agent tank 54 to move on the top end of the aeration tank 2, then the agent control component 56 puts the agent in the agent tank 54 into the aeration tank 2, and then the scraping component 57 scrapes the floating matter in the aeration tank 2 into the collection box 55, and the agent accelerates the rapid floating of small impurities in the sewage.

Specifically, the agent control component 56 includes an agent control shaft 561, an agent control disk 562, an agent control motor 563, a driving wheel 564, a driven wheel 565 and a belt 566, the agent control shaft 561 is rotatably mounted at the top end of the dosing rack 51, the agent control disk 562 is mounted at the bottom of the agent control shaft 561, the top of the agent control disk 562 attaches to the bottom of the agent discharge tube 542, the agent control disk 562 is provided with an agent control hole 567 corresponding to the agent discharge tube 542, the agent control motor 563 is vertically disposed at the top end of the dosing rack 51, the driving wheel 564 is mounted on an output shaft of the agent control motor 563, the driven wheel 565 is mounted on the agent control shaft 561, and the belt 566 sleeves the outside of the driving wheel 564 and the driven wheel 565; the agent control motor 563 works to drive the driving wheel 564 to rotate, the driving wheel 564 drives the driven wheel 565 to rotate through the belt 566, the driven wheel 565 drives the agent control shaft 561 and the agent control disk 562 to rotate, the agent control hole 567 rotates to correspond to the agent discharge tube 542, an agent in the agent tank 54 fall into the aeration tank 2 through the agent discharge tube 542 and the agent control hole 567, and during dosing, only the agent control hole 567 needs to be rotated to be separated from the agent discharge tube 542, which is very convenient.

Specifically, the scraping component 57 includes a mounting plate 571, a scraper 572, two mounting racks 573 and two electric push rods 574, the two mounting racks 573 are symmetrically disposed at the top end of the dosing rack 51, the two electric push rods 574 are respectively disposed on the two mounting racks 573, the mounting plate 571 is mounted on the output ends of the two electric push rods 574, and the scraper 572 is mounted on the bottom of the mounting plate 571; the two electric push rods 574 work to drive the mounting plate 571 to move downwards, the mounting plate 571 drives the scraper 572 to move downwards until the scraper is consistent with the floating matter in the aeration tank 2, then the first lead screw slide table 52 works to drive the scraper 572 to move horizontally, and the scraper 572 scrapes the floating matter in the aeration tank 2 into the collection box 55.

Specifically, the filtering assembly 6 includes a containing frame 61, a screen 62, two sliding grooves 63, two limiting rails 64 and two lifting components 65, the two sliding grooves 63 are symmetrically disposed on the inner wall of the filter tank 3, the two limiting rails 64 are symmetrically disposed at the top of the filter tank 3, the inside of the two limiting rails 64 is matched with the two sliding grooves 63, the containing frame 61 is disposed on the filter tank 3, two sides of the containing frame 61 are in sliding fit with the two sliding grooves 63, the screen 62 is detachably mounted in the containing frame 61, the two lifting components 65 are symmetrically disposed at the top of the treatment table 1, and the bottom ends of the two lifting components 65 are connected with the top of the containing frame 61; the two lifting components 65 work synchronously to drive the containing frame 61 to move upwards on the two sliding grooves 63, and the containing frame 61 moves out of the filter tank 3 through the two limiting rails 64, thus the impurities on the screen 62 can be conveniently cleaned, and meanwhile, the screen 62 can be conveniently replaced.

Specifically, each lifting component 65 includes a lifting rack 651, a winch 652, a pulley 653 and a steel rope 654, the lifting rack 651 is erected at the top of the treatment table 1, the winch 652 is mounted at the top of the lifting rack 651, the pulley 653 is rotatably mounted at the top of the lifting rack 651, the top end of the steel rope 654 is connected with the winch 652, and the bottom end of the steel rope 654 penetrates through the pulley 653 and then is connected with the top of the containing frame 61; the winch 652 drives the top end of the steel rope 654 to wind its surface, and the bottom end of the steel rope 654 pulls the containing frame 61 to move upwards by utilizing the pulley 653.

Specifically, the cleaning assembly 7 includes a cleaning rack 71, a second lead screw slide table 72, a hydraulic push rod 73, a U-shaped rack 74, a regulating rail 75, two regulating racks 76, two regulating push rods 77 and two cleaning components 78, the cleaning rack 71 is erected at the top of the treatment table 1, the second lead screw slide table 72 is horizontally disposed at the top end of the cleaning rack 71, the hydraulic push rod 73 is vertically disposed at a moving end of the second lead screw slide table 72, the U-shaped rack 74 is mounted at the output end of the hydraulic push rod 73, the regulating rail 75 is horizontally disposed at the top end of the U-shaped rack 74, the two regulating racks 76 are slidably mounted on the regulating rail 75, the two regulating push rods 77 are symmetrically disposed in the U-shaped rack 74, the output ends of the two regulating push rods 77 are respectively connected with the two regulating racks 76, the two cleaning components 78 are symmetrically disposed on the two regulating racks 76, each cleaning component 78 includes a rotating rack 781, a cleaning roll 782 and a cleaning motor 783, the rotating racks 781 are mounted on the regulating racks 76, the cleaning roll 782 is rotatably mounted in the rotating rack 781, a plurality of bristles 784 are disposed on the cleaning roll 782, the cleaning motor 783 is vertically disposed at the top of the rotating rack 781, and an output shaft of the cleaning motor 783 is connected with the cleaning roll 782; the second lead screw slide table 72 drives the two cleaning components 78 to move to two sides of the screen 62 in match with the hydraulic push rod 73, then the two regulating push rods 77 drive the two regulating racks 76 to move on the regulating rail 75, the two regulating racks 76 drive the two cleaning components 78 to move to contact with the screen 62, then the cleaning motor 783 drives the cleaning roll 782 to rotate, the cleaning roll 782 drives the plurality of bristles 784 to rotate to clean the screen 62, the second lead screw slide table 72 drives the cleaning roll 782 to move horizontally to clean all parts of the screen 62, thus realizing the purpose of automatically cleaning the impurities on the screen 62 to prevent the impurities from blocking the screen 62.

Specifically, the washing assembly 8 includes a washing table 81, a washing barrel 82, a support plate 83, a driving motor 84, a rotating gear 85, a cross frame 86, a moving rack 87 and two guide rails 88, the two guide rails 88 are symmetrically disposed at the top of the treatment table 1, the washing table 81 is mounted on the two guide rails 88 in a sliding manner, the washing barrel 82 is vertically disposed on the top of the washing table 81, the outer wall of the bottom end of the washing barrel 82 is provided with a blowdown pipe 821 communicated with its inside, the blowdown pipe 821 is provided with a valve 822, the support plate 83 is mounted on the outer wall of the washing table 81, the driving motor 84 is horizontally disposed on the top of the support plate 83, the rotating gear 85 is mounted on an output shaft of the driving motor 84, the cross frame 86 is mounted on the top of the treatment table 1, the moving rack 87 is disposed horizontally on the top of the cross frame 86, and the moving rack 87 is meshed with the rotating gear 85; the driving motor 84 drives the rotating gear 85 to rotate, the rotating gear 85 drives the washing table 81 to move on the two guide rails 88 through the moving rack 87, so that the washing barrel 82 can sequentially move to the position below the cleaning rolls 782 in the two cleaning components 78, and the two cleaning rolls 782 can be cleaned sequentially.

Embodiment 2

Figure 11:
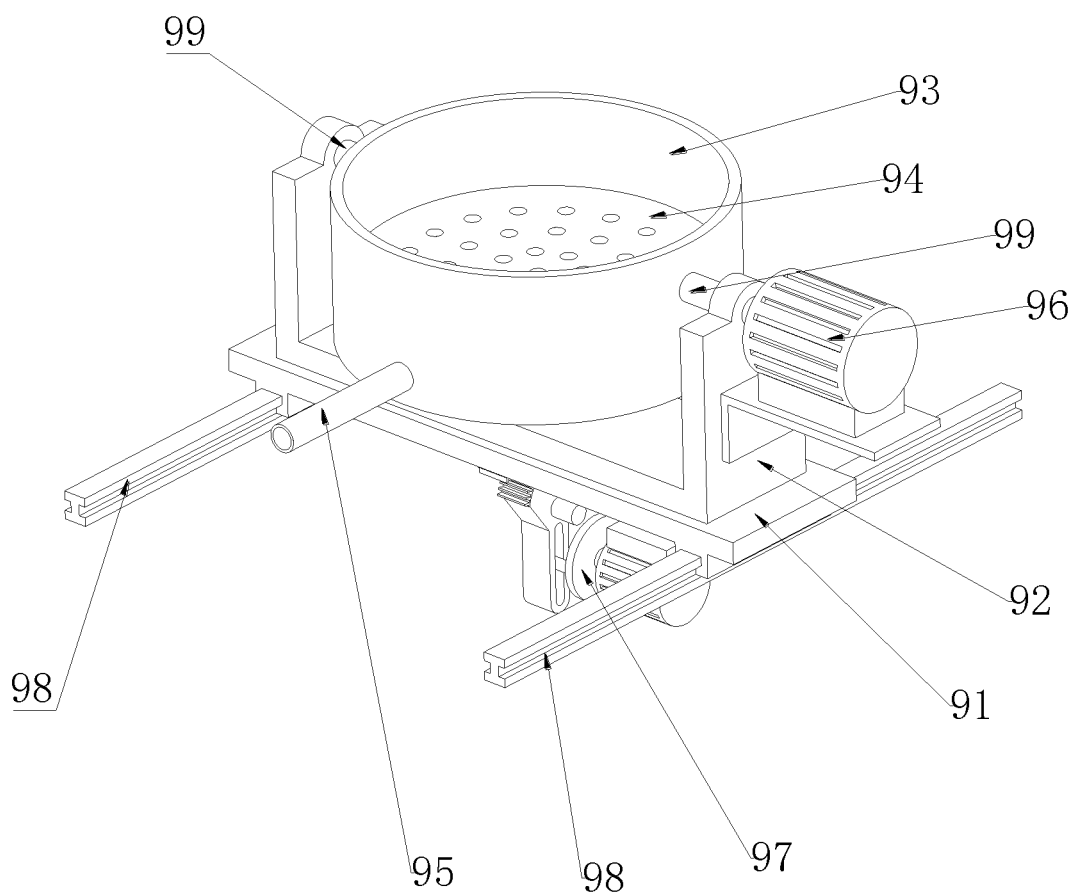
FIG. 11 is a schematic structure diagram I of a three-dimensional view of a pollutant passing assembly of the application.
Figure 12:
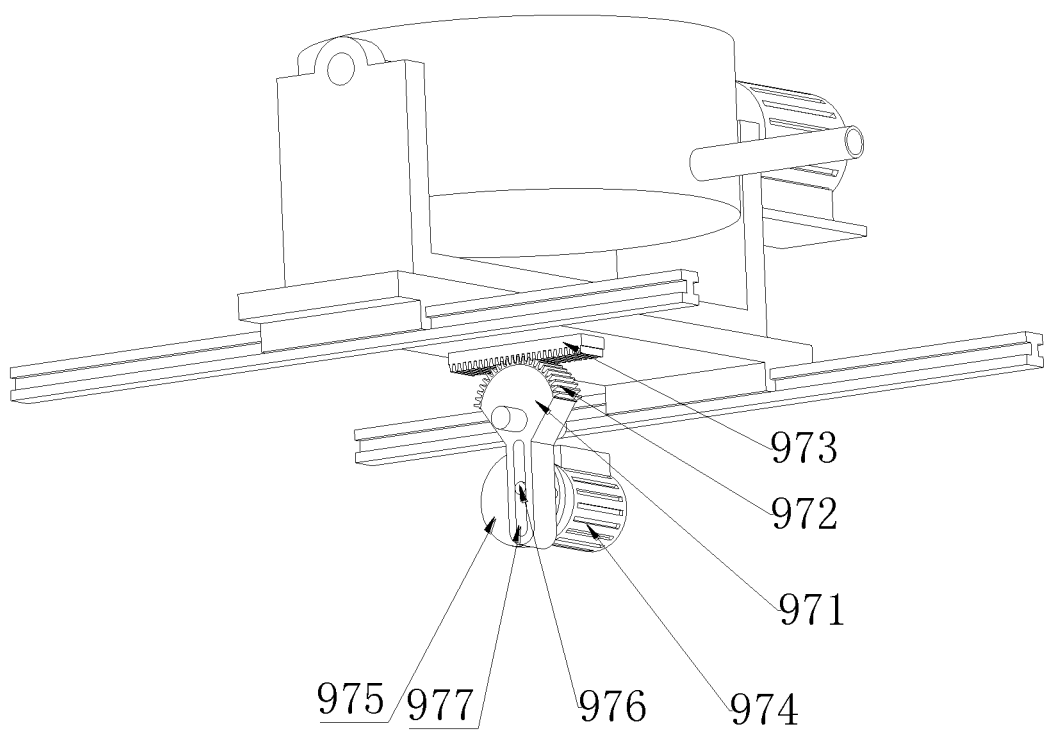
FIG. 12 is a schematic structure diagram II of a three-dimensional view of a pollutant passing assembly of the application.
Figure 13:
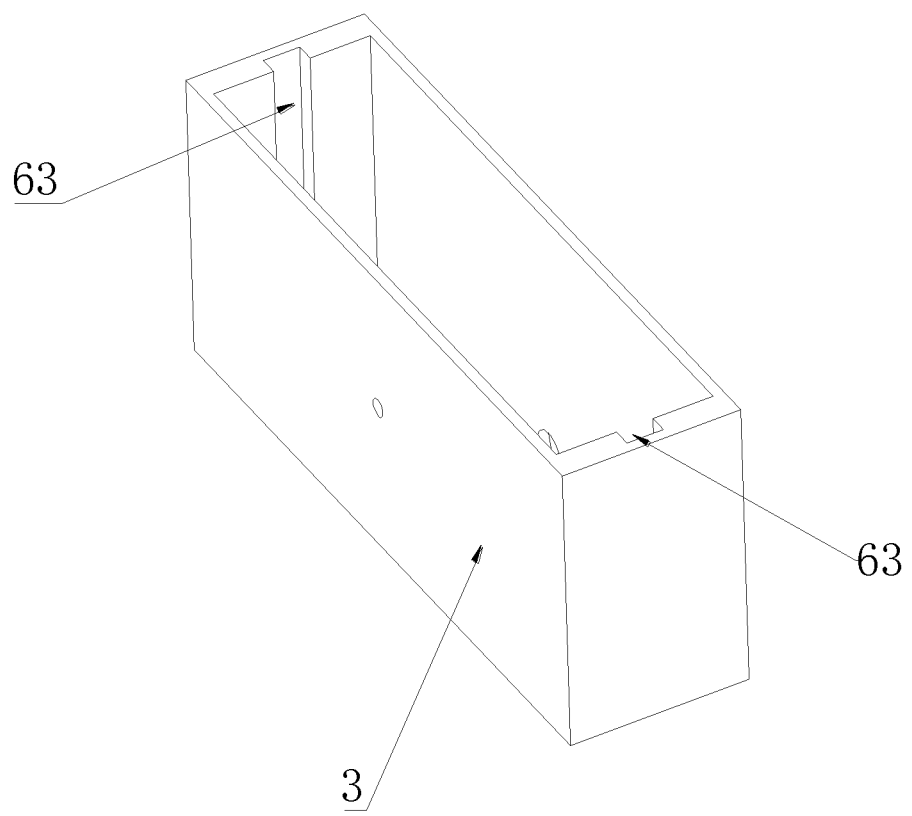
FIG. 13 is a schematic structure diagram of a three-dimensional view of a filter tank of the application.

As shown in FIGS. 1, 11 and 12, for a sewage purification treatment apparatus capable of being assembled in a prefabricated way, which is basically the same as Embodiment 1, the top of the treatment table 1 is further provided with a pollutant passing assembly 9, the pollutant passing assembly 9 is located below the end, away from the washing barrel 82, of the blowdown pipe 821, the pollutant passing assembly 9 includes a slide plate 91, a rotating seat 92, a pollutant passing barrel 93, a filter screen 94, a discharge pipe 95, a rotating motor 96, a swinging component 97, two sliding rails 98 and two rotating shafts 99, the two sliding rails 98 are symmetrically disposed on the top of the treatment table 1, the slide plate 91 is mounted on the two sliding rails 98 in a sliding manner, a rectangular groove 11 is disposed at the position, at the slide plate 91, of the treatment table 1, the rotating seat 92 is mounted on the top of the slide plate 91, the pollutant passing barrel 93 is rotatably mounted at the top end of the rotating seat 92 through two rotating shafts 99, the filter screen 94 is disposed in the pollutant passing barrel 93, the discharge pipe 95 is mounted on the outer wall of the bottom end of the pollutant passing barrel 93, the rotating motor 96 is horizontally disposed on the outer wall of the rotating seat 92, the output shaft of the rotating motor 96 is connected with one of the rotating shafts 99, the swinging component 97 is mounted in the rectangular groove 11, the top end of the swinging component 97 is connected with the bottom of the slide plate 91, the swinging component 97 includes a swinging handle 971, an arc-shaped gear 972, a swinging rack 973, a swinging motor 974, a rotating table 975 and an eccentric column 976, the swinging handle 971 is rotatably mounted in the rectangular groove 11, the bottom end of the swinging handle 971 is provided with a driving groove 977, the arc-shaped gear 972 is mounted on the top of the swinging handle 971, the swinging rack 973 is disposed horizontally at the bottom of the slide plate 91, the swinging rack 973 is meshed with the arc-shaped gear 972, the swinging motor 974 is disposed horizontally at the bottom of the treatment table 1, the rotating table 975 is mounted on the output shaft of the swinging motor 974, the eccentric column 976 is mounted at the edge of the rotating table 975, and the eccentric column 976 is in sliding fit the driving groove 977; the valve 822 is opened, the washing sewage in the washing barrel 82 enters the pollutant passing barrel 93 through the blowdown pipe 821, the filter screen 94 filters the sewage which then is drained through the discharge pipe 95, meanwhile, the swinging motor 974 drives the rotating table 975 and the eccentric column 976 to rotate, the eccentric column 976 drives the swinging handle 971 to swing by a certain angle in a reciprocating manner by utilizing the driving groove 977, the swinging handle 971 drives the swinging rack 973 to horizontally move by a certain distance in a reciprocating manner by utilizing the arc-shaped gear 972, then the slide plate 91 horizontally moves by a certain distance in a reciprocating manner, and the slide plate 91 drives the sewage in the pollutant passing barrel 93 to shake, thus improving the filtration efficiency of the filter screen 94.

Embodiment 3

Figure 14:
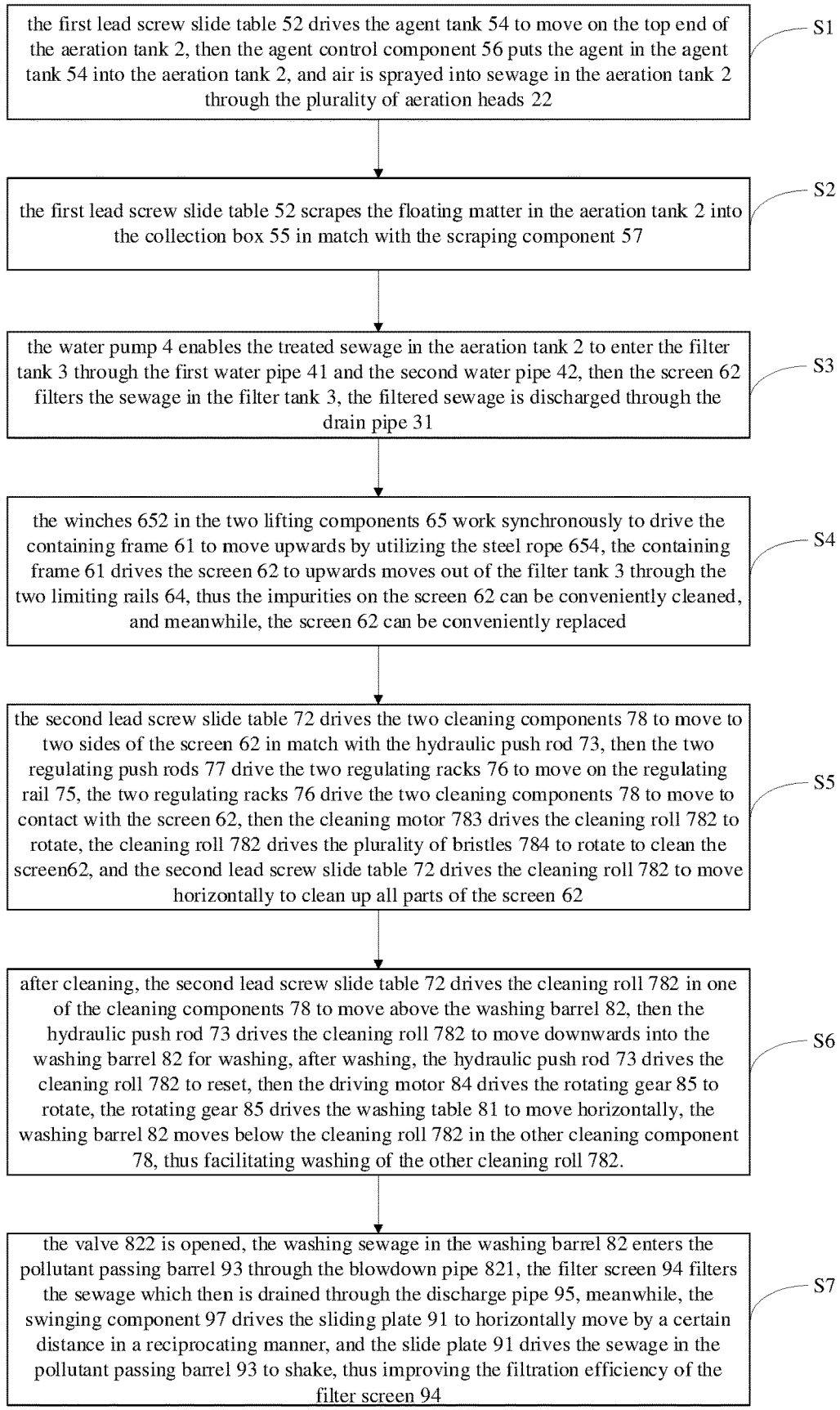
FIG. 14 is a use method of a sewage purification treatment apparatus capable of being assembled in a prefabricated way.

As shown in FIG. 14, the application also discloses a use method of a sewage purification treatment apparatus capable of being assembled in a prefabricated way, based on the sewage purification treatment apparatus capable of being assembled in a prefabricated way in Embodiment 1 and Embodiment 2, and the use method of the sewage purification treatment apparatus capable of being assembled in a prefabricated way includes the following steps:

S1, the first lead screw slide table 52 drives the agent tank 54 to move on the top end of the aeration tank 2, then the agent control component 56 puts the agent in the agent tank 54 into the aeration tank 2, and air is sprayed into sewage in the aeration tank 2 through the plurality of aeration heads 22.

S2, the first lead screw slide table 52 scrapes the floating matter in the aeration tank 2 into the collection box 55 in match with the scraping component 57.

S3, the water pump 4 enables the treated sewage in the aeration tank 2 to enter the filter tank 3 through the first water pipe 41 and the second water pipe 42, then the screen 62 filters the sewage in the filter tank 3, the filtered sewage is discharged through the drain pipe 31.

S4, the winches 652 in the two lifting components 65 work synchronously to drive the containing frame 61 to move upwards by utilizing the steel rope 654, the containing frame 61 drives the screen 62 to upwards moves out of the filter tank 3 through the two limiting rails 64, thus the impurities on the screen 62 can be conveniently cleaned, and meanwhile, the screen 62 can be conveniently replaced.

S5, the second lead screw slide table 72 drives the two cleaning components 78 to move to two sides of the screen 62 in match with the hydraulic push rod 73, then the two regulating push rods 77 drive the two regulating racks 76 to move on the regulating rail 75, the two regulating racks 76 drive the two cleaning components 78 to move to contact with the screen 62, then the cleaning motor 783 drives the cleaning roll 782 to rotate, the cleaning roll 782 drives the plurality of bristles 784 to rotate to clean the screen 62, and the second lead screw slide table 72 drives the cleaning roll 782 to move horizontally to clean up all parts of the screen 62.

S6, after cleaning, the second lead screw slide table 72 drives the cleaning roll 782 in one of the cleaning components 78 to move above the washing barrel 82, then the hydraulic push rod 73 drives the cleaning roll 782 to move downwards into the washing barrel 82 for washing, after washing, the hydraulic push rod 73 drives the cleaning roll 782 to reset, then the driving motor 84 drives the rotating gear 85 to rotate, the rotating gear 85 drives the washing table 81 to move horizontally, the washing barrel 82 moves below the cleaning roll 782 in the other cleaning component 78, thus facilitating washing of the other cleaning roll 782.

S7, the valve 822 is opened, the washing sewage in the washing barrel 82 enters the pollutant passing barrel 93 through the blowdown pipe 821, the filter screen 94 filters the sewage which then is drained through the discharge pipe 95, meanwhile, the swinging component 97 drives the sliding plate 91 to horizontally move by a certain distance in a reciprocating manner, and the slide plate 91 drives the sewage in the pollutant passing barrel 93 to shake, thus improving the filtration efficiency of the filter screen 94.

The previous description of the disclosed embodiments enables those skilled in the art to implement or use the application. Various modifications to these embodiments will be readily apparent to those skilled in the art, and the generic principles defined herein may be implemented in other embodiments without departing from the spirit or scope of the application. Thus, the application is not to be limited to these embodiments shown herein but is to be accorded the widest scope consistent with the principles and novel features disclosed herein.

What is claimed is:

1. A sewage purification treatment apparatus capable of being assembled in a prefabricated way, comprising a treatment table, an aeration tank, a filter tank, a water pump, a dosing assembly, a filtering assembly, a cleaning assembly and a washing assembly, wherein
   the aeration tank and the filter tank are disposed at a top of the treatment table at an interval, an aeration plate is disposed at a bottom end of an inside of the aeration tank, the aeration plate is provided with a plurality of aeration heads, the aeration plate is provided with an air transmission pipe connected with an external air source;
   an outer wall of a bottom end of the filter tank is provided with a drain pipe communicated with an inside of the filter tank, the water pump is disposed horizontally between the aeration tank and the filter tank, a first water pipe is disposed between an input end of the water pump and the aeration tank, a second water pipe is disposed between an output end of the water pump and the filter tank; and
   the dosing assembly is mounted at a top end of the aeration tank, the filtering assembly is mounted inside the filter tank, a top end of the filtering assembly extends above the filter tank, the cleaning assembly is mounted on the top of the treatment table, one end of the cleaning assembly extends above the filter tank, and the washing assembly is mounted on the top of the treatment table;
   the filtering assembly comprises a containing frame, a screen, two sliding grooves, two limiting rails and two lifting components;
   the two sliding grooves are symmetrically disposed on an inner wall of the filter tank, the two limiting rails are symmetrically disposed at a top of the filter tank, an inside of the two limiting rails is matched with the two sliding grooves; and
   the containing frame is disposed on the filter tank, two sides of the containing frame are in sliding fit with the two sliding grooves, the screen is detachably mounted in the containing frame, the two lifting components are symmetrically disposed at the top of the treatment table, and bottom ends of the two lifting components are connected with a top of the containing frame;
   the cleaning assembly comprises a cleaning rack, a second lead screw slide table, a hydraulic push rod, a U-shaped rack, a regulating rail, two regulating racks, two regulating push rods and two cleaning components;
   the cleaning rack is erected at the top of the treatment table, the second lead screw slide table is horizontally disposed at an end of the cleaning rack, the hydraulic push rod is vertically disposed at a moving end of the second lead screw slide table, the U-shaped rack is mounted at an output end of the hydraulic push rod;
   the regulating rail is horizontally disposed at a top end of the U-shaped rack, the two regulating racks are slidably mounted on the regulating rail, the two regulating push rods are symmetrically disposed in the U-shaped rack, output ends of the two regulating push rods are respectively connected with the two regulating racks; and
   the two cleaning components are symmetrically disposed on the two regulating racks, each cleaning component comprises a rotating rack, a cleaning roll and a cleaning motor, the rotating racks are mounted on the regulating racks, the cleaning roll is rotatably mounted in the rotating rack, a plurality of bristles are disposed on the cleaning roll, the cleaning motor is vertically disposed at a top of the rotating rack, and an output shaft of the cleaning motor is connected with the cleaning roll;
   the washing assembly comprises a washing table, a washing barrel, a support plate, a driving motor, a rotating gear, a cross frame, a moving rack and two guide rails;
   wherein the two guide rails are symmetrically disposed at the top of the treatment table, the washing table is mounted on the two guide rails in a sliding manner; and
   the washing barrel is vertically disposed on a top of the washing table, an outer wall of a bottom end of the washing barrel is provided with a blowdown pipe communicated with an inside of the washing barrel, the blowdown pipe is provided with a valve, the support plate is mounted on an outer wall of the washing table, the driving motor is horizontally disposed on a top of the support plate, the rotating gear is mounted on an output shaft of the driving motor, the cross frame is mounted on the top of the treatment table, the moving rack is disposed horizontally on a top of the cross frame, and the moving rack is meshed with the rotating gear.

2. The sewage purification treatment apparatus capable of being assembled in a prefabricated way according to claim 1, wherein the dosing assembly comprises a dosing rack, a first lead screw slide table, a moving plate, an agent tank, a collection box, an agent control component, a scraping component, two supports and two moving rails;
   the two supports are symmetrically disposed on an outer wall of the top end of the aeration tank, the two moving rails are respectively disposed on tops of the two supports, the dosing rack is mounted on the two moving rails in a sliding manner;
   the first lead screw slide table is disposed horizontally on the top of one of the supports, the moving plate is mounted on a moving end of the first lead screw slide table, the moving plate is connected with the dosing rack, the agent tank is vertically disposed on a top of the dosing rack; and
   a top and a bottom of the agent tank are respectively provided with an agent feeding tube and an agent discharge tube, the collection box is mounted on an outer wall of the top end of the aeration tank, the agent control component is mounted at a top end of the dosing rack, and the scraping component is mounted on an outer wall of the top end of the dosing rack.

3. The sewage purification treatment apparatus capable of being assembled in a prefabricated way according to claim 2, wherein the agent control component comprises an agent control shaft, an agent control disk, an agent control motor, a driving wheel, a driven wheel and a belt; and the agent control shaft is rotatably mounted at the top end of the dosing rack, the agent control disk is mounted at a bottom of the agent control shaft, a top of the agent control disk attaches to a bottom of the agent discharge tube, the agent control disk is provided with an agent control hole corresponding to the agent discharge tube, the agent control motor is vertically disposed at the top end of the dosing rack, the driving wheel is mounted on an output shaft of the agent control motor, the driven wheel is mounted on the agent control shaft, and the belt sleeves an outside of the driving wheel and the driven wheel.

4. The sewage purification treatment apparatus capable of being assembled in a prefabricated way according to claim 3, wherein the scraping component comprises a mounting plate, a scraper, two mounting racks and two electric push rods; and the two mounting racks are symmetrically disposed at the top end of the dosing rack, the two electric push rods are respectively disposed on the two mounting racks, the mounting plate is mounted on output ends of the two electric push rods, and the scraper is mounted on a bottom of the mounting plate.

5. The sewage purification treatment apparatus capable of being assembled in a prefabricated way according to claim 4, wherein each lifting component comprises a lifting rack, a winch, a pulley and a steel rope, the lifting rack is erected at the top of the treatment table, the winch is mounted at a top of the lifting rack, the pulley is rotatably mounted at the top of the lifting rack, a top end of the steel rope is connected with the winch, and a bottom end of the steel rope penetrates through the pulley and then is connected with the top of the containing frame.

6. The sewage purification treatment apparatus capable of being assembled in a prefabricated way according to claim 5, wherein the top of the treatment table is further provided with a pollutant passing assembly, the pollutant passing assembly is located below an end, away from the washing barrel, of the blowdown pipe, the pollutant passing assembly comprises a slide plate, a rotating seat, a pollutant passing barrel, a filter screen, a discharge pipe, a rotating motor, a swinging component, two sliding rails and two rotating shafts;

the two sliding rails are symmetrically disposed on the top of the treatment table, the slide plate is mounted on the two sliding rails in a sliding manner, a rectangular groove is disposed at a position, at the slide plate, of the treatment table, the rotating seat is mounted on a top of the slide plate, the pollutant passing barrel is rotatably mounted at a top end of the rotating seat through two rotating shafts;

the filter screen is disposed in the pollutant passing barrel, the discharge pipe is mounted on an outer wall of a bottom end of the pollutant passing barrel, the rotating motor is horizontally disposed on an outer wall of the rotating seat, an output shaft of the rotating motor is connected with one of the rotating shafts; and the swinging component is mounted in the rectangular groove, a top end of the swinging component is connected with a bottom of the slide plate, the swinging component comprises a swinging handle, an arc-shaped gear, a swinging rack, a swinging motor, a rotating table and an eccentric column, the swinging handle is rotatably mounted in the rectangular groove, a bottom end of the swinging handle is provided with a driving groove, the arc-shaped gear is mounted on a top of the swinging handle, the swinging rack is disposed horizontally at the bottom of the slide plate, the swinging rack is meshed with the arc-shaped gear, the swinging motor is disposed horizontally at a bottom of the treatment table, the rotating table is mounted on an output shaft of the swinging motor, the eccentric column is mounted at an edge of the rotating table, and the eccentric column is in sliding fit the driving groove.

* * * * *